United States Patent [19]
Andoh et al.

[11] Patent Number: 6,088,818
[45] Date of Patent: Jul. 11, 2000

[54] DATA READ APPARATUS AND DATA READ METHOD

[75] Inventors: Haruo Andoh, Zama; Keiji Kobayashi, Fujisawa; Kazunari Tsuchimoto, Sagamihara, all of Japan

[73] Assignee: International Business Machines Corporation, Armonk, N.Y.

[21] Appl. No.: 09/009,143

[22] Filed: Jan. 20, 1998

[30] Foreign Application Priority Data

Jan. 22, 1997 [JP] Japan .................................. 9-232102

[51] Int. Cl.$^7$ ...................................................... G06F 11/00
[52] U.S. Cl. ........................... 714/703; 714/704; 714/712
[58] Field of Search .................................. 714/703, 718, 714/704, 56, 712

[56] References Cited

U.S. PATENT DOCUMENTS 5,566,296  10/1996  Ohmori et al. ......................... 395/180

*Primary Examiner*—Phung M. Chung
*Attorney, Agent, or Firm*—G. Marlin Knight

[57] ABSTRACT

To decrease the number of read errors of a storage device due to bus noise when data is transferred between a host apparatus and the storage device. When a read error due to bus noise is detected, transfer of data to a host apparatus is temporarily stopped when executing rereading to eliminate bus noise which is a cause of the read error. In a preferred embodiment bus noise errors are distinguished by looking at the frequency of errors and the retry count for the previous error. The error is detected as a bus noise error if the frequency is above a threshold and the retry count is below a threshold. Data transfer can be restarted when a buffer becomes full or when the reading of the data is successfully completed.

10 Claims, 3 Drawing Sheets

DATA READ APPARATUS AND DATA READ METHOD

BACKGROUND OF THE INVENTION

1. Field of the Invention

The present invention relates to a method and a read apparatus for reading data out of a storage device. More particularly, the present invention relates to a data read method and a data read apparatus characterized by a method for transferring data between a host apparatus and a storage device when a read error occurs due to bus noise.

2. Background Art

Because notebook-type personal computers are further decreased in size and weight, various peripheral devices are compacted in its small frame. In this frame, because various noises are generated, the peripheral devices are in inferior environment. Particularly, a hard disk drive is subject to noise because the drive detects a slight change of a magnetic flux with a magnetic head following recording tracks on a magnetic disk to read the data recorded in the magnetic disk.

A data bus is a noise source nearest to a hard disk drive. For example, usually when reading data simultaneously with transfer of data to a host apparatus (in this case, the MPU or the like of a notebook-type personal computer), a read error occurs whenever reading one sector in the worst case. For example, usually reading of 128 sectors is completed in the time for one rotation of a disk. However, if retries are executed due to an error in each sector, the time for 128 rotations of the disk may be required.

Therefore, in the case of a notebook-type personal computer, various measures by hardware are generally taken including shielding.

However, the above hardware measures may be insufficient depending on the specification of a host apparatus. In this case, the number of read errors of a hard disk drive (HDD) increases.

Therefore, it is an object of the present invention to decrease the number of read errors of a storage device due to bus noise when transferring data between a host apparatus and the storage device.

Moreover, it is another object of the present invention to decrease the number of read errors by firmware or software in a storage device.

SUMMARY OF THE INVENTION

A method of the present invention comprises detecting occurrence of a read error due to bus noise, stopping execution of transfer of data to the host apparatus to reduce bus noise and rereading of data out of the storage device.

A data storage device of the present invention comprises a storage medium, a head for reading data stored in the storage medium, a bus and a processor control section which generates bus activity when transfering data to a host, distinguishes occurrences of read errors due to bus noise and stops transfering data to the host when rereading data because of bus noise errors.

In a preferred embodiment bus noise errors are distinguished by looking at the frequency of errors and the retry count for the previous error. The error is detected as a bus noise error if the frequency is above a threshold and the retry count is below a threshold. The device records one or more addresses where an error of any kind was detected and one or more retry counts for these units. When a second or subsequent error occurs the device examines the difference between the current address and the address for at least the last data unit for which a read error occurred and the retry count. The data transfers to the host are stopped before rereading the second data unit when a difference between the first address and an address for the second data unit is less than a threshold value and the retry count is less than a selected value. Data transfer can be restarted when the buffer becomes full or when the reading of the data is successfully completed.

DETAILED DESCRIPTION OF THE PREFERRED EMBODIMENT

Figure 1:
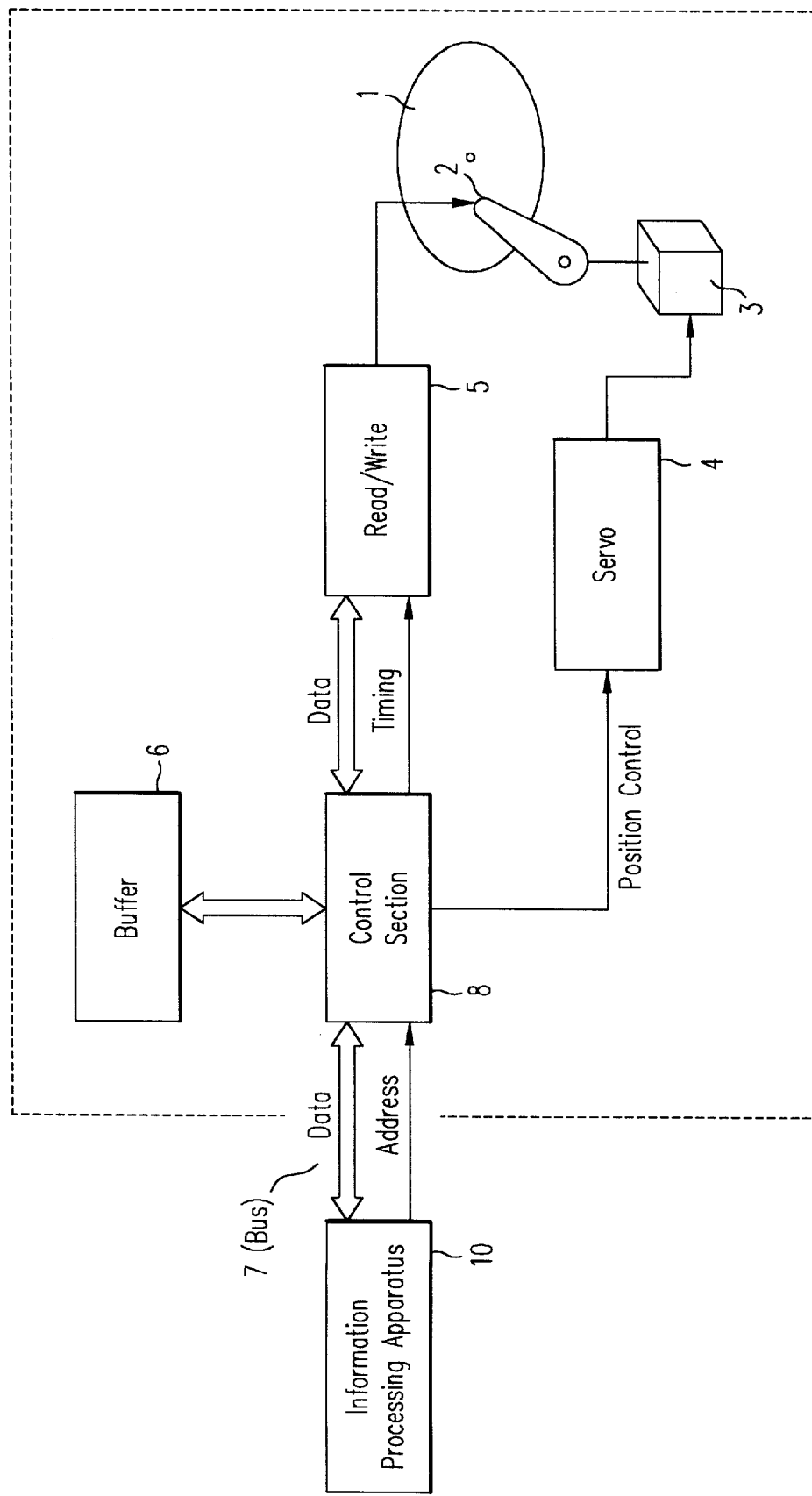
FIG. 1 is a block diagram showing the structure of the disk drive of an embodiment of the present invention.

FIG. 1 is a block diagram showing the structure of the disk drive of the preferred embodiment of the present invention. The disk drive is constituted by applying the present invention to a small disk drive used for, for example, a notebook-type personal computer.

The disk drive comprises a storage medium, e.g., a magnetic disk 1 for recording data, a head 2 for reading or writing data out of or into the magnetic disk 1, an actuator 3 for moving the head 2, a servo system 4 for controlling the actuator 3, a read/write system 5 for controlling read/write by the head 2, a buffer 6 for holding read/write data, and a control section 8 for controlling every operation of the disk drive and input/output of data to or from an external unit (host apparatus) 10 connected through a bus 7.

The buffer 6 may have a capacity capable of holding the data hundreds of recording units (sectors) or more on the magnetic disk 1.

The control section 8 is provided with a processor for executing a control program, a control program, and memories for holding the data for a defect map showing the position of a defective sector. The control section 8 is provided with a RAM and ROM as the memories and the control program is stored in, for example, the ROM. Though the operation speed of the ROM is higher than that of the RAM, the capacity is limited from the viewpoint of the mounting property or cost. Therefore, a control program which cannot be entirely stored in the ROM is stored in a predetermined region on the magnetic disk 1 and executed by reading the program into the RAM at the time of POR (Power On Reset).

The control section 8 controls every operation of a disk drive and read/write for the magnetic disk 1 in accordance with the commands and data supplied from the host apparatus through the bus 7.

Moreover, the processor of the control section 8 is able to execute a plurality of processes at the same time. One of the processes is control of input/output of commands and data to or from the host apparatus 10, another is a write cache process for writing the write data held by the buffer 6 in the magnetic disk 1, and still another is a read cache process for looking ahead of the data whose reading is designated from the host apparatus or the data which may be read out of the magnetic disk 1 and holding the data in the buffer 6. In addition to the above processes, the processor executes a process for computation of servo control and a process for error recovery at the same time.

In the case of the process for control of input/output for the host apparatus 10, when a command for requesting data writing, an address (e.g. logical block address: LBA) for designating a write destination (sector on the magnetic disk 1), and write data are supplied to the control section 8 from the host apparatus 10, the section 8 holds the supplied write data in the buffer 2 and thereafter, releases the host apparatus 10 from write processing. Moreover, when a command for requesting data reading and an address (LBA) in which the data to be read is stored are supplied from the host apparatus 10, the control section 8 reads the data whose reading is requested and supplies the data to the host apparatus 10 if the data is read out of the magnetic disk 1 and held by the buffer 2 or instructs the read/write system 5 to read the data whose read is requested unless the data is held by the buffer 2, and supplies the read data to the host apparatus 10.

In the write cache process, the control section 8 sequentially reads the write data held by the buffer 2 because of being supplied from the host apparatus 10 as described above, supplies the data to the read/write system 5, and instructs the system to write the data into the magnetic disk 1.

Moreover, in the read cache process, the control section 8 instructs the read/write system 5 to read the data whose read may be requested from the host apparatus 10 and holds the read data in the buffer 2.

In addition to the above processes, the processor of the control section 8 detects whether read of data by the read/write system 5 causes a read error due to noise on the bus 7 and executes the error recovery processing in accordance with the detection result.

A read error due to noise on the bus 7 is characterized in that, if an error frequently occurs while data is transferred, the data recovers by one-time retry. Therefore, in the case of the error recovery processing, an error due to noise on the bus 7 is distinguished from other errors by first checking the error occurrence frequency and then checking the retry frequency. Moreover, it is possible to distinguish the former from the latter in accordance with only either of the error occurrence frequency and the retry frequency.

If a read error due to noise on the bus 7 occurs, simultaneous execution of transfer of data to the host apparatus 10 and read of data out of the magnetic disk 1 is stopped and only data read is executed. Thereby, bus noise are decreased and the error occurrence frequency due to bus noise is decreased.

When a data read operation is executed under the above state, the data read out of the magnetic disk 1 are sequentially held by the buffer 6. Moreover, when any one of the following conditions is satisfied, transfer of the data read out of the magnetic disk 1 and held by the buffer 6 to the host apparatus is started.

(a) Drive catchup (State in which the buffer 6 is filled with read data)

Under the above state, it is impossible to read the next data unless the data held by the buffer 6 is transferred to the host apparatus 10. Therefore, the data is transferred and thereafter, data reading is continued.

(b) Buffer ready (State in which previous read is performed through "look ahead" and the data necessary for a command sent from the host apparatus 10 is already read by the buffer 6).

For example, the above state corresponds to the case in which the processing for reading a plurality of commands sent from the host apparatus 10 is executed and read of data for any command is completed. Under the above state, it is necessary to continue read of data for other commands.

(c) Command completed (State in which read corresponding to a read command is completed while "look ahead" is not performed)

Under the above state, because all the data for commands are already held by the buffer 6, it is not necessary to perform further reading and therefore, reading is completed.

(d) Read hard error (State in which reading is impossible)

Under the above state, reading of data for commands is impossible. Therefore, the fact is communicated to the host apparatus 10 and reading is completed.

Figure 2:
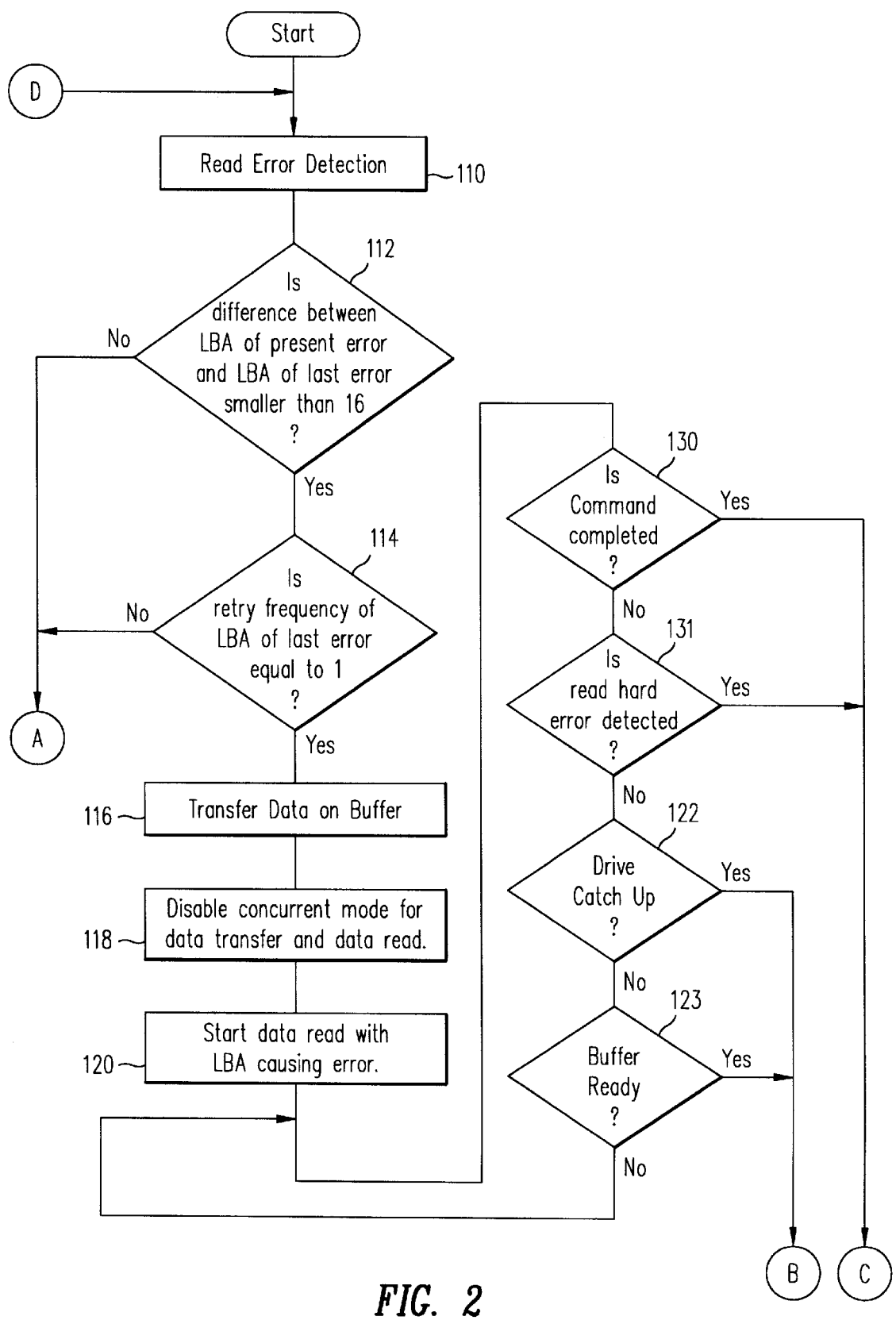
FIG. 2 is a flow chart showing the error recovery processing by the disk drive of an embodiment of the present invention.
Figure 3:
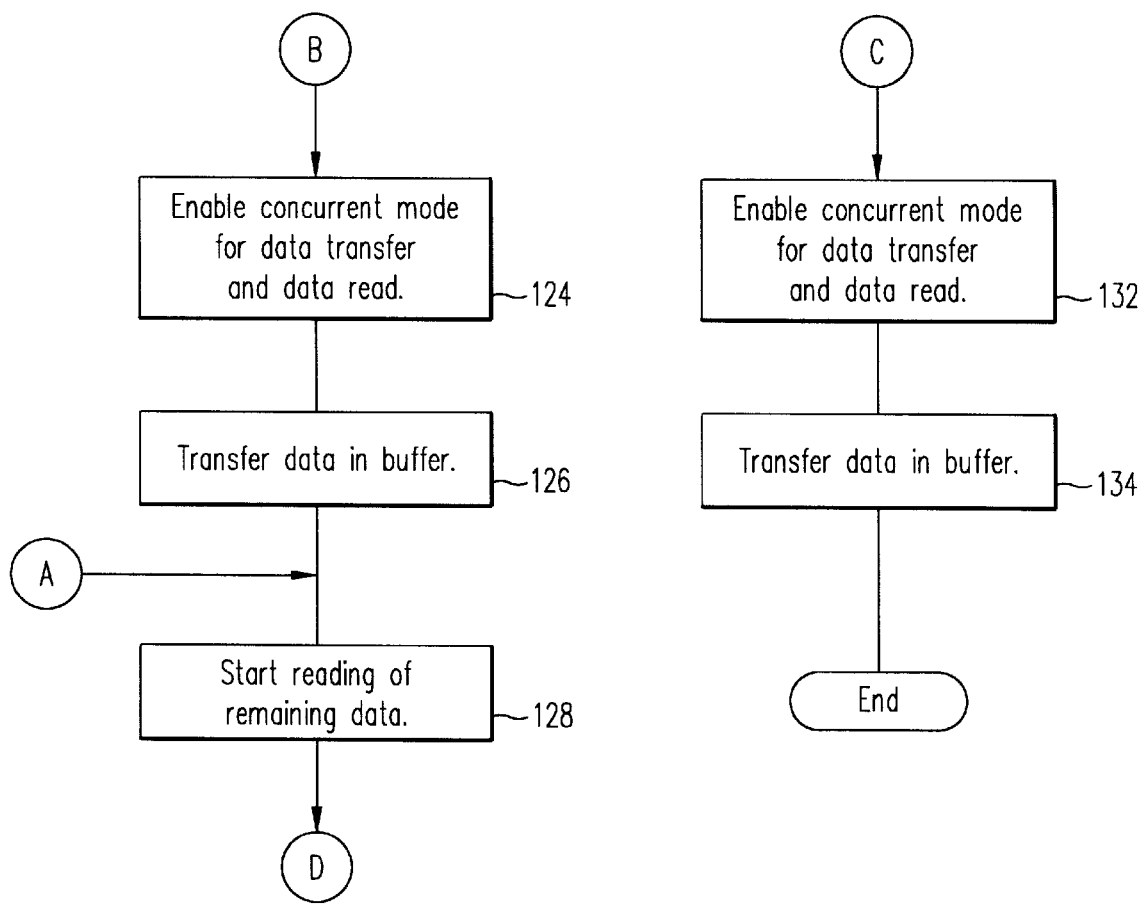
FIG. 3 is a flow chart showing the error recovery processing by the disk drive of an embodiment of the present invention.

FIGS. 2 and 3 are flow charts showing the above error recovery processing. First, when a read error is detected in step 110 in FIG. 2, it is judged in the following steps 112 and 114 whether the read error is caused by bus noise.

In step 112, the read-error occurrence frequency is determined. In general, access to the magnetic disk 1 is frequently performed for an adjacent LBA in a short time period. Therefore, continuous occurrence of a read error in an adjacent LBA represents that a plurality of read errors occur in a short time and thus, it is estimated that the read-error occurrence frequency is high. Therefore, in step 112, it is indirectly judged whether the read-error occurrence frequency is equal to or more than a predetermined threshold (e.g. 16) by obtaining the difference between a logical block address (LBA) in which a read error occurs at present and an LBA in which a read error occurred last time and comparing the difference with the predetermined threshold.

When the difference between the logical block address (LBA) in which the most recent read error occurs and the LBA in which a read error occurred last time is smaller than the threshold (16), the read-error occurrence frequency is high and thus, the possibility that a read error is caused by bus noise is high. Therefore, step 114 is started after step 112 is completed and judgement on whether an error is caused by bus noise is continued. However, when the difference is equal to or more than the threshold (16), the read-error occurrence frequency is not very high and therefore, the possibility that an error is caused by bus noise is low. Therefore, step 128 in FIG. 3 is started after step 112 is completed to continue data read. Moreover, the value of the threshold is not restricted to the number 16. It is also possible to directly detect the read-error occurrence frequency by counting the number of read errors for every predetermined time interval. In this case, the processing load becomes larger than that in step 112 because it is necessary to count the number of read errors for every predetermined time.

In step 114, it is judged whether the retry frequency of the LBA in which a read error occurred last time is equal to or more than a predetermined threshold (e.g. 1). If the retry frequency is equal to the threshold (1), processings on and after step 116 are executed because the possibility that an error is caused by bus noise is high. If the retry frequency is larger than the threshold (1), the possibility that an error is caused by bus noise is low. Therefore, step 128 in FIG. 3 is started to continue data read. The value of the threshold is not restricted to the number 1. It is possible to set the threshold to a value of 2 or more or change the threshold in accordance with an LBA after the LBA in which a read error occurred last time.

When it is judged in steps 112 and 114 that a read error is caused by bus noise, step 116 is started to transfer all effective data in the buffer 6 to the host apparatus 10 and temporarily make the buffer 6 empty. Thereafter, in step 118, the concurrent I/O mode for simultaneously executing transfer of data to the host apparatus 10 and read of data out of the magnetic disk 1 is disabled. Thereby, because bus noise due to data transfer are eliminated, read is restarted in step 120. By performing data read under the above state, it is possible to decrease the number of read errors due to bus noise.

After restarting read of data out of the magnetic disk 1, the above conditions (a), (b), (c), and (d) are judged in steps 122, 123, 130, and 131.

When the condition (a) "buffer is filled" or (b) "buffer ready" is satisfied, step 124 in FIG. 3 is started after step 122 or step 123 is completed. After the concurrent I/O mode is enabled in step 124, the data held by the buffer 6 is transferred to the host apparatus 10 in step 126. Thereafter, read of remaining data is started in step 128 and then, step 110 in FIG. 2 is restarted to monitor occurrence of a read error.

Moreover, when the condition (c) "command completed" or (d) "read hard error" is satisfied, step 132 is started after step 130 or step 131 is completed to enable the concurrent I/O mode in step 132 and thereafter, the data held by the buffer 6 is transferred to the host apparatus 10 in step 134 to complete operation.

As described above, this embodiment makes it possible to decrease the number of read errors due to bus noise by reading data from the magnetic disk 1 while stopping the transfer of data to the host apparatus 10 when a read error due to bus noise is detected.

Moreover, this embodiment makes it possible to decrease the number of read errors due to bus noise by the software (microprogram) to be executed by the processor of the control section 8 without requiring hardware measures such as shielding. Therefore, it is possible to contribute to reduction of the cost of an apparatus using a storage device.

Furthermore, the present invention is not restricted to the above embodiment. Various modifications are allowed within the range of the technical idea of the present invention. In the case of the above embodiment, for example, a case is described in which the present invention is applied to a disk drive. However, it is also possible to apply the present invention to a storage device connected to a host apparatus through a bus such as a storage device card or other storage device.

Because the present invention makes it possible to stop the simultaneous execution of transfer of data to a host apparatus and read of data out of a storage device in the control step in accordance with an error detected in the error detection step, it is possible to decrease the read software error rate of a storage device due to bus noise while data is transferred between the host apparatus and the storage device.

What is claimed is:

1. A method for reading data from of a storage device having a bus, comprising steps of:
   reading designated data from said storage device;
   detecting occurrence of a read error due to bus noise by determining a number of retries for a previous read error and deciding that a read error is not due to bus noise when the number of retries is equal to or more than a predetermined threshold; and
   responsive to the detecting step, stopping transfer of data to said host apparatus to reduce the bus noise and then rereading the designated data from the storage device.

2. The method according to claim 1, the detecting step further comprising determining whether an error frequency for previous read errors is equal to or more than a selected threshold and deciding that a read error is not due to bus noise when the frequency of read errors is equal to or more than a predetermined threshold and wherein the data read from the storage device is temporarily stored in a buffer, the method further comprising the step of restarting transfer of data to the host apparatus when the buffer is filled with data.

3. The method according to claim 1, further comprising the step of restarting transfer of data to the host apparatus when reading of the designated data is completed without error.

4. A method, for reading data from of a storage device having a bus, comprising steps of:
   reading designated data from said storage device;
   detecting occurrence of a read error due to bus noise by determining whether an error frequency for previous read errors is equal to or more than a selected threshold and deciding that a read error is not due to bus noise when the frequency of read errors is equal to or more than a predetermined threshold; and
   responsive to the detecting step, stopping transfer of data to said host apparatus to reduce the bus noise and then rereading the designated data from the storage device.

5. A data storage device having a bus and a control section which generates bus activity when transfering data to a host, the apparatus further comprising:
   a storage medium;
   a head for reading data stored in the storage medium;
   a control section which distinguishes occurrences of read errors due to bus noise and stops transfering data to the host when rereading data subject to a bus noise error, and which determines a magnitude of a difference between an address of a previous data unit for which a bus noise error occurred and an address of a current unit and distinguishes an occurrence of a read error not due to bus noise when the difference is more than a threshold value.

6. The data storage device of claim 5 wherein the control section saves a retry count for a previous read error and distinguishes an occurrence of a read error not due to bus noise when the retry count is more than a threshold value.

7. The data storage device of claim 6 wherein the control section determines a magnitude of a difference between an address of a previous data unit for which a bus noise error occurred and an address of a current unit and distinguishes an occurrence of a read error not due to bus noise when the difference is more than a threshold value and the data storage device further comprising a buffer for temporarily storing data read from the storage device and wherein the control section restarts transfer of data to the host when the buffer is filled with data.

8. The data storage device of claim 7 wherein the control section restarts transfer of data to the host when reading of the data is completed without error.

9. A data storage device comprising:
   a storage medium containing data;
   a bus on which activity occurs when data is transferred to a host;
   means for detecting read errors when a data unit is read from the storage medium;
   means for retrying to read a data unit when an read error is detected;
   means for recording a first address and a retry count of a first designated data unit for which a read error occurred;

means for handling a second designated data unit for which a read error occurs by stopping data transfers to the host before rereading the second designated data unit when a difference between the first address and an address for the second designated data unit is less than a threshold value and the retry count is less than a selected value.

10. The data storage device of claim 9 further comprising a buffer for temporarily storing data read from the storage device and wherein the means for handling a second designated data unit restarts transfer of data to the host when the buffer is filled with data or when the reading of the second designated data unit is completes without error.

* * * * *